(12) United States Patent
Sillick (10) Patent No.: US 9,377,550 B2
(45) Date of Patent: Jun. 28, 2016

(54) SOURCE UMBILICAL CABLE WITHOUT FUNCTIONING POWER CABLES

(71) Applicant: PGS Geophysical AS, Lysaker (NO)

(72) Inventor: Sean Sillick, New Milton (GB)

(73) Assignee: PGS Geophysical AS, Oslo (NO)

( * ) Notice: Subject to any disclaimer, the term of this patent is extended or adjusted under 35 U.S.C. 154(b) by 293 days.

(21) Appl. No.: 14/145,746

(22) Filed: Dec. 31, 2013

(65) Prior Publication Data

US 2015/0071032 A1    Mar. 12, 2015

Related U.S. Application Data

(60) Provisional application No. 61/876,313, filed on Sep. 11, 2013.

(51) Int. Cl.
*G01V 1/38* (2006.01)

(52) U.S. Cl.
CPC ............ *G01V 1/3835* (2013.01); *G01V 1/3808* (2013.01)

(58) Field of Classification Search
CPC ...... G01V 1/38; G01V 1/3835; G01V 1/3808
USPC ...................................... 367/15, 21
See application file for complete search history.

(56) References Cited

U.S. PATENT DOCUMENTS

| | | | |
|---|---|---|---|
| 4,597,065 A * | 6/1986 | Lien | F16L 11/12 174/47 |
| 4,890,568 A * | 1/1990 | Dolengowski | B63B 21/66 114/163 |
| 4,928,262 A | 5/1990 | Neeley et al. | |
| 5,400,298 A | 3/1995 | Hepp | |
| 6,002,648 A | 12/1999 | Ambs | |
| 6,028,817 A | 2/2000 | Ambs | |
| 6,292,436 B1 | 9/2001 | Rau et al. | |
| 6,716,063 B1 | 4/2004 | Bryant et al. | |
| 7,371,136 B2 | 5/2008 | Hine et al. | |
| 7,411,399 B2 | 8/2008 | Reddig et al. | |
| 7,426,438 B1 * | 9/2008 | Robertsson | G06Q 30/06 702/14 |
| 7,642,784 B2 | 1/2010 | Reddig et al. | |
| 7,816,797 B2 | 10/2010 | Nair | |
| 8,351,294 B2 | 1/2013 | Stokkeland et al. | |

(Continued)

OTHER PUBLICATIONS

DigiRANGE Acoustic Ranging System Buoy/Source/Hull Mount (CTX), Input/Output, Inc., 1999, revised Oct. 2003, 2 pages.

(Continued)

*Primary Examiner* — Daniel L Murphy
(74) *Attorney, Agent, or Firm* — Meyertons, Hood, Kivlin, Kowert & Goetzel, P.C.

(57) ABSTRACT

Techniques are disclosed relating to the operation of a source umbilical cable without functioning power cables from the source umbilical cable. Techniques are disclosed relating to a source umbilical cable without a power cable (e.g., a cable configured or operable to supply electrical power), and an apparatus that includes a geophysical signal source (e.g., a seismic signal source) with an electrical power generating component. The apparatus may, in one embodiment, include a geophysical signal source with a local generator configured to supply electrical power to electrical components of the geophysical signal source. In another embodiment where the geophysical signal source is being towed behind a vessel, a generator of the geophysical signal source may generate and supply electrical power based on motion of the generator through a body of water.

22 Claims, 8 Drawing Sheets

(56) References Cited

U.S. PATENT DOCUMENTS

| | | | |
|---|---|---|---|
| 2009/0147619 A1 | 6/2009 | Welker | |
| 2009/0204274 A1* | 8/2009 | Bittleston | G01V 1/3826 700/302 |
| 2009/0316524 A1 | 12/2009 | Tenghamn | |
| 2010/0278010 A1 | 11/2010 | Gubin et al. | |
| 2011/0266086 A1 | 11/2011 | Welker et al. | |
| 2012/0223718 A1 | 9/2012 | Peppe et al. | |
| 2012/0250456 A1 | 10/2012 | Tenghamn | |
| 2012/0250457 A1 | 10/2012 | Rickert, Jr. et al. | |
| 2012/0275265 A1* | 11/2012 | Nielsen | B63B 27/146 367/20 |
| 2013/0093426 A1 | 4/2013 | Peppe et al. | |

OTHER PUBLICATIONS

DigiRANGE II™ Acoustic Ranging System Buoy / Source / Hull Mount (CTX), ION Geophysical Corporation, 2007, 2 pages.

Jeremy Beckman, Seabed processing, minimum umbilical systems offer longer tie-back prospects, Offshore, copyright 1998 Oil & Gas Journal, http://www.offshore-mag.com/articles/print/volume-58/issue-8/news/processing/seabed-pr.html, 5 pages. [Retrieved May 26, 2013].

Towed Streamer Positioning System—Performance Data, ION Geophysical Corporation, 2007, 10 pages.

Electronic Systems, PartnerPlast—leading specialist in plastic and rotation moulding, http://www.partnerplast.no/Seismic/electronic.html, 1 page. [Retrieved Dec. 20, 2013], 2013.

ScienceDirect.com—Renewable and Sustainable Energy Reviews, Abstract for Transmission alternatives for offshore electrical power by Iñigo, Martínez de Alegría, et al. (vol. 13, Issue 5, Jun. 2009, pp. 1027-1038), http://www.sciencedirect.com/science/article/pii/S1364032108000567, 1 page. [Retrieved May 26, 2013].

Document Preview, APAC Concept: A New Umbilical-Less Subsea Control System by Stephen Byrne, et al. (Subsea Controls and Data Acquisition '98: Cost effective challenges for a geographically expanding industry, Apr. 22-23, 1998), http://www.onepetro.org/mslib/app/Preview.do?paperNumber=SUT-SCADA-98-119&soc, 2 pages. [Retrieved May 26, 2013].

* cited by examiner

SOURCE UMBILICAL CABLE WITHOUT FUNCTIONING POWER CABLES

CROSS-REFERENCE TO RELATED APPLICATIONS

This application claims the benefit of Provisional Patent Application No. 61/876,313 filed Sep. 11, 2013, which is hereby incorporated by reference in its entirety.

BACKGROUND

This application generally relates to the field of marine geophysical surveying. More specifically, the application relates to methods and equipment for marine geophysical surveying. In particular, methods and apparatus related to the operation of a source umbilical cable without functioning power cables are disclosed.

In the oil and gas exploration industry, marine geophysical surveying is commonly used in the search for subterranean formations. Marine geophysical surveying techniques yield knowledge of the subsurface structure of the Earth, which is useful for finding and extracting hydrocarbon deposits such as oil and natural gas. Seismic surveying and electromagnetic surveying are two of the well-known techniques of marine geophysical surveying.

For example, in a seismic survey conducted in a marine environment (which may include saltwater, freshwater, and/or brackish water environments), one or more seismic signal sources are typically configured to be submerged and towed by a vessel such as a survey vessel. The survey vessel is typically also configured to tow one or more (typically a plurality of) laterally-spaced streamers through the water. In a typical seismic survey, a vessel may tow a seismic signal source (e.g., an air gun or a marine vibrator) and a plurality of streamers along which a number of acoustic sensors (e.g., hydrophones and/or geophones) are located. In some instances, acoustic sensors may be secured at or near the bottom of the body of water. Acoustic waves generated by the seismic signal source may be transmitted to the Earth's crust and then, after interacting with the subsurface formation, captured at the acoustic sensors.

Likewise, electromagnetic surveys may tow equipment, including electromagnetic signal sources and streamers, in a similar fashion. For example, an electromagnetic transmitter (also referred to as an electromagnetic signal source or as an antenna) may be used to generate electromagnetic signals that are propagated into the subterranean structure, interact with subterranean elements, and then be received by electromagnetic receivers (also referred to as electromagnetic sensors) on the streamers (and/or at or near the bottom of the body of water). Data collected during a marine geophysical survey may be analyzed to locate hydrocarbon-bearing geological structures, and thus determine where deposits of oil and natural gas may be located. Some techniques of marine geophysical surveying involve the simultaneous use of seismic and electromagnetic survey equipment.

In a typical marine seismic survey, a seismic source such as a marine vibrator or an air gun is commonly used. For example, a plurality of air guns of different sizes may typically be included in an air gun array towable behind a survey vessel or another vessel. The air gun array is generally suspended by chains of selected length from a buoy, float or similar flotation device. In a typical air gun array, an individual air gun includes two electrical leads connected to a solenoid valve for firing the air gun. In addition, the air gun typically includes a high pressure air feed line.

Continuing with the example, an air gun array typically receives electrical power and air from onboard equipment of a vessel via a source umbilical cable. One end of a source umbilical cable is generally coupled to onboard equipment of the vessel whereas the other end of the source umbilical cable is connected to components and devices of the air gun array. A source umbilical cable generally includes, for example, air conduits, air hoses, and cables such as power cables (may be referred to as "power cores") to supply air and electricity, respectively, to the air gun array from relevant onboard sources of a vessel. A source umbilical cable is generally considered a complex structure. In addition to a stress member, a source umbilical cable may include electrical, optical and hydraulic pipes or cables which allow for power, data communication, control and fluid injection between devices on the water surface (e.g., onboard devices of a vessel) and the various subsea devices.

When used with either seismic or electromagnetic surveying, a source umbilical cable commonly includes one or more electrical conductors which may be operable to provide electrical power to electrical devices and/or components of a geophysical signal source (or simply "signal source"). Such electrical conductors may be referred to as one or more power cables of a source umbilical cable, and may be a single wire, a pair of twisted wires, or multiple wires or wire pairs helically wound or otherwise bound together into a source umbilical cable. Through the power cable, an electrical power supply unit onboard of a vessel may supply electrical power to the electrical devices and/or components. An electrical power supply unit onboard of a vessel is typically coupled to a source umbilical cable to provide electrical power through the source umbilical cable to electrical devices and/or components of a source array.

In a typical geophysical survey, the more individual signal sources (either seismic or electromagnetic) are added to the source array, the larger the diameter and weight of the source umbilical cable generally is. The large diameter and weight of a source umbilical cable typically creates a great amount of frictional, turbulent and/or vibrational "drag" from the water as it is being towed behind a vessel. Not only does the drag increase fuel consumption, but the drag also induces stress on the source umbilical cable leading to rupture and leakage. The diameter and weight of a source umbilical cable are generally considered to be factors limiting the quantity of individual signal sources to be towed and the amount of offset between the vessel and the source array. Moreover, a high power requirement such as the power requirement for an acoustic ranging unit over long ranges is often another bottleneck in the operation. High power requirement generally shortens battery life for battery-powered devices and puts constraints on those devices powered inductively from the source umbilical cable.

When a source umbilical cable is damaged or ruptured, its internal components including the power cables that supply electricity to the source array may fail, resulting in interruption or suspension of the entire survey operation. Repairing faulty components of the source umbilical cable, however, is often challenging with such a large bundle of air lines, wires, and other components in one source umbilical cable. Splicing into the entire source umbilical cable is often necessary to locate and/or test electrical or pneumatic faults. Separating the faulty component from the large bundle of air lines, wires and other components, repairing the faulty component, reassembling the source umbilical cable, and repairing the rupture is a time-consuming and costly process.

Accordingly, a need exists for an improved techniques and apparatus for conducting marine geophysical survey operations. A need exists for a more robust and more reliable source umbilical cable that may tow a large quantity of signal sources. There is a continuing need for larger arrays and acquiring larger amounts of geophysical data.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to", "usable to", or "operable to" perform a task or tasks. In such contexts, "configured to", "usable to" and "operable to" is each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to", "usable to", or "operable to" language include hardware—for example, circuits, memory storing program instructions executable to implement the operation, etc. Reciting that a device/unit/circuit/component is "configured to", "usable to", or "operable to" perform one or more tasks is expressly intended not to invoke 35 U.S.C. §112(f), for that device/unit/circuit/component.

Further, as used herein, the terms "first," "second," "third," etc. do not necessarily imply an ordering (e.g., temporal) between elements. For example, a reference to a "first" marine geophysical signal source and a "second" such source may refer to any two different sources. In short, references such as "first," "second," etc. are used as labels for ease of reference in the description and the appended claims.

While at least a portion of this disclosure refers explicitly to seismic surveying, it is important to recognize that the survey system disclosed is not limited to seismic survey, but rather any geophysical survey system which includes the operation of a source umbilical cable without power cables. Other types of geophysical signal sources may include, without limitation, seismic and electromagnetic signal sources. Accordingly, the references to seismic signal sources are provided as non-limiting examples.

Figure 1:
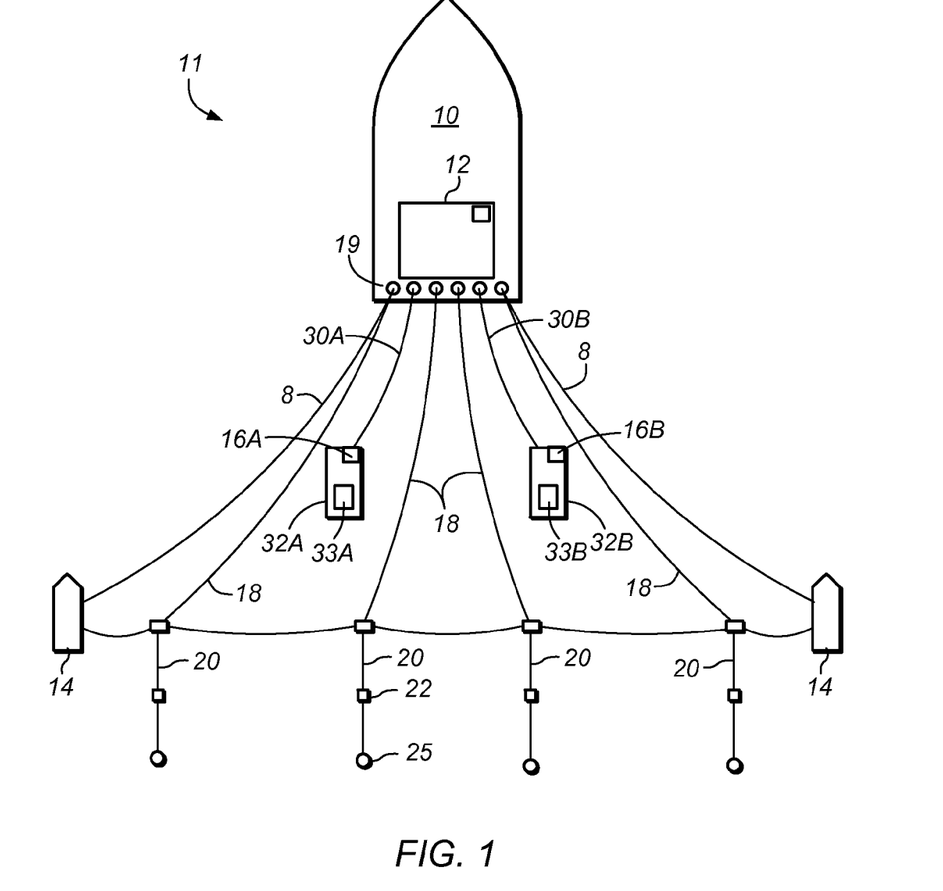
FIG. 1 illustrates one embodiment of a geophysical survey system including a source umbilical cable without functioning power cables.

FIG. 1 shows an embodiment of a marine geophysical survey system that may include a plurality of individual geophysical signal sources (also referred to as "signal source(s)") in a signal source array. The signal source array may be coupled to a source umbilical cable that is towed through a body of water by a vessel. As used herein, the words "coupled", "couple", "attach," or "attached" and other derivations thereof mean a connection between components, whether direct or indirect.

Referring to FIG. 1, an illustration of one embodiment of a geophysical survey system is shown. In the illustrated embodiment, the system includes vessel 10, source umbilical cables 30A and 30B, geophysical signal sources 32A and 32B, paravanes 14, source array steering devices 16A and 16B, and streamers 20.

Vessel 10 may be configured to move along a surface of body of water 11 such as a lake or the ocean. In the illustrated embodiment, vessel 10 tows streamers 20, signal sources 32A and 32B, and optional paravanes 14. In other embodiments, streamers 20 may be towed by a second vessel (not shown), rather than or in addition to vessel 10.

Vessel 10 may include equipment, shown generally at 12 and for convenience collectively referred to as "recording system". Recording system 12 may include devices such as a data recording unit (not shown separately) for making a record with respect to time of signals generated by various geophysical sensors. Recording system 12 may also include navigation equipment (not shown separately), which may be configured to control, determine, and record, at selected times, the geodetic positions of: survey vessel 10, each of signal sources disposed on signal sources 32A and 32B, and/or geophysical sensors 22 (e.g., seismic sensors or electromagnetic sensors) disposed at spaced-apart locations on streamers 20. In some embodiments, geophysical sensors 22 may be secured at or near the bottom of the body of water 11, either in addition to or in place of the geophysical sensors 22 on the streamers. As illustrated in FIG. 1, streamers 20 are coupled to vessel 10 via cables 18. Streamers 20 may further include tail buoys 25 at a distal end of each streamer 20. Paravanes 14, coupled to vessel 10 by cables 8, generally provide lateral force to maintain the spread of the streamer array.

Geodetic position (or "position") of signal sources 32A and 32B may be determined using various devices, including navigation equipment such as relative acoustic ranging units and/or global navigation satellite systems (e.g., a global positioning system (GPS)). In the illustrated embodiment, signal sources 32A and 32B respectively include geodetic positioning devices 33A and 33B. Signal sources 32A and 32B may additionally include acoustic ranging unit 60 (shown in FIG. 2).

In the geophysical survey system illustrated in FIG. 1, vessel 10 may tow two signal sources 32A and 32B by way of source umbilical cables 30A and 30B, respectively. In various embodiments, survey vessel 10 may tow any operable number of signal sources, including as few as none or as many as 6 or more. The location of signal sources 32A and 32B may be centered behind survey vessel 10 or displaced from the center line. Signal sources 32A and 32B may be towed at various distances and depths behind vessel 10, including attached to the hull of vessel 10. Signal sources 32A and 32B may be any type of signal source known in the art. For example, signal sources 32A and 32B may impart seismic, electromagnetic field, and/or other energy directed to various structures in the Earth's subsurface formation below the bottom of body of water 11. Seismic energy, in one non-limiting embodiment, may originate from signal sources 32A and 32B, or an array of such sources, deployed in body of water 11 and towed by vessel 10. In another non-limiting embodiment, a wire loop or electrode pair may be used to impart electromagnetic energy.

Each of signal sources 32A and 32B may include sub-arrays of multiple individual signal sources. For example, signal source 32 may include a plurality of air guns, marine vibrators, or electromagnetic signal sources. In some embodiments including the embodiment illustrated in FIG. 1, each of signal sources 32A and signal sources 32B may be a sub-array of a signal source array towable behind vessel 10. Signal source 32 may be a sub-array that includes a plurality of individual signal sources 17 (individual air guns in a seismic survey, for example) that are connected by way of load bearing members 26 (e.g., chains shown in FIG. 2). The term "signal source," as used herein, may refer to a single signal source or to an array of signal sources. In various embodiments, a geophysical survey system may include any appropriate number of towed signal sources 32. In an embodiment where signal source 32 includes a plurality of individual air guns (e.g., in a seismic survey), signal source 32 may include three to eight gun strings (as non-limiting examples), and each gun string may have several individual air guns.

Signal sources 32A and 32B may include various devices including navigation and other devices. For example, signal sources 32A and 32B may include navigation devices such as geodetic positioning devices 33A and 33B, acoustic ranging units, water depth sensors, pressure sensors, and/or hydrophones that are configured to provide data including data indicative of respective positions of signal sources 32A and 32B. In one non-limiting embodiment, at least one of the sensors, geodetic positioning device 33A, or acoustic ranging unit may include one or more electrical components that are operable based on electricity or electrical power. For example, signal sources 32A and 32B may include electrical leads connected to a solenoid valve for activating signal sources 32A and 32B (e.g., firing of an air gun). In another non-limiting embodiment, geodetic positioning devices 33A and 33B may each include electrical components such as a receiver (e.g., a radio receiver) that is operable using electrical power. In this embodiment, acoustic ranging unit 60 may include electrical components such as a signal transponder. As used herein, the term "electrical component" includes any and all components, parts, devices, apparatus, or systems that may be powered or operable based on electrical power, electrical energy, and/or electricity.

Signal sources 32A and 32B may each include steering device 16A and 16B. Steering devices 16A and 16B may provide steering capability to signal sources 32A and 32B. Steering devices 16A and 16B may each control a movement, a location, and/or a position of signal source 32A and 32B. In one embodiment, steering devices 16A and 16B may impart hydrodynamic lift related to the controlling or steering of signal sources 32A and 32B. In certain embodiments, the controlling or steering of signal source 32A may be exercised by imparting force on float device 36 of signal source 32A. In some embodiments, steering devices 16A and 16B may provide control including lateral steering of signal sources 32A and 32B. Steering device 16A may include an electrical component such as an actuator which may cause a deflecting motion of a plane of steering device 16A. In some embodiments, the actuator may be a stepper motor that includes various electrically powered components such as an electromagnet, a microcontroller, and others.

In the illustrated embodiment of FIG. 1, signal sources 32A and 32B are each coupled to vessel 10 at one end through winch 19 or a similar spooling device that enables changing the deployed length of each source umbilical cable 30A and 30B. In certain embodiments where signal sources 32A and 32B are air guns, source umbilical cables 30A and 30B may each include, within an exterior jacket, a high pressure air supply line to supply air for signal sources 32A and 32B. In these embodiments, the high pressure air may be supplied by an onboard high pressure compressor (not shown) of vessel 10.

Source umbilical cables 30A and 30B may each include, within the exterior jacket, internal components such a plurality of conductors (e.g., electrical conductors) and/or optic cables for signal communication between recording system 12 and devices of signal sources 32A and 32B. Such devices may include the above mentioned sensors along with geodetic positioning devices 33A and 33B. In some embodiments, source umbilical cables 30A and 30B may also include at least one stress member configured to bear towing force during operation.

Figure 2:
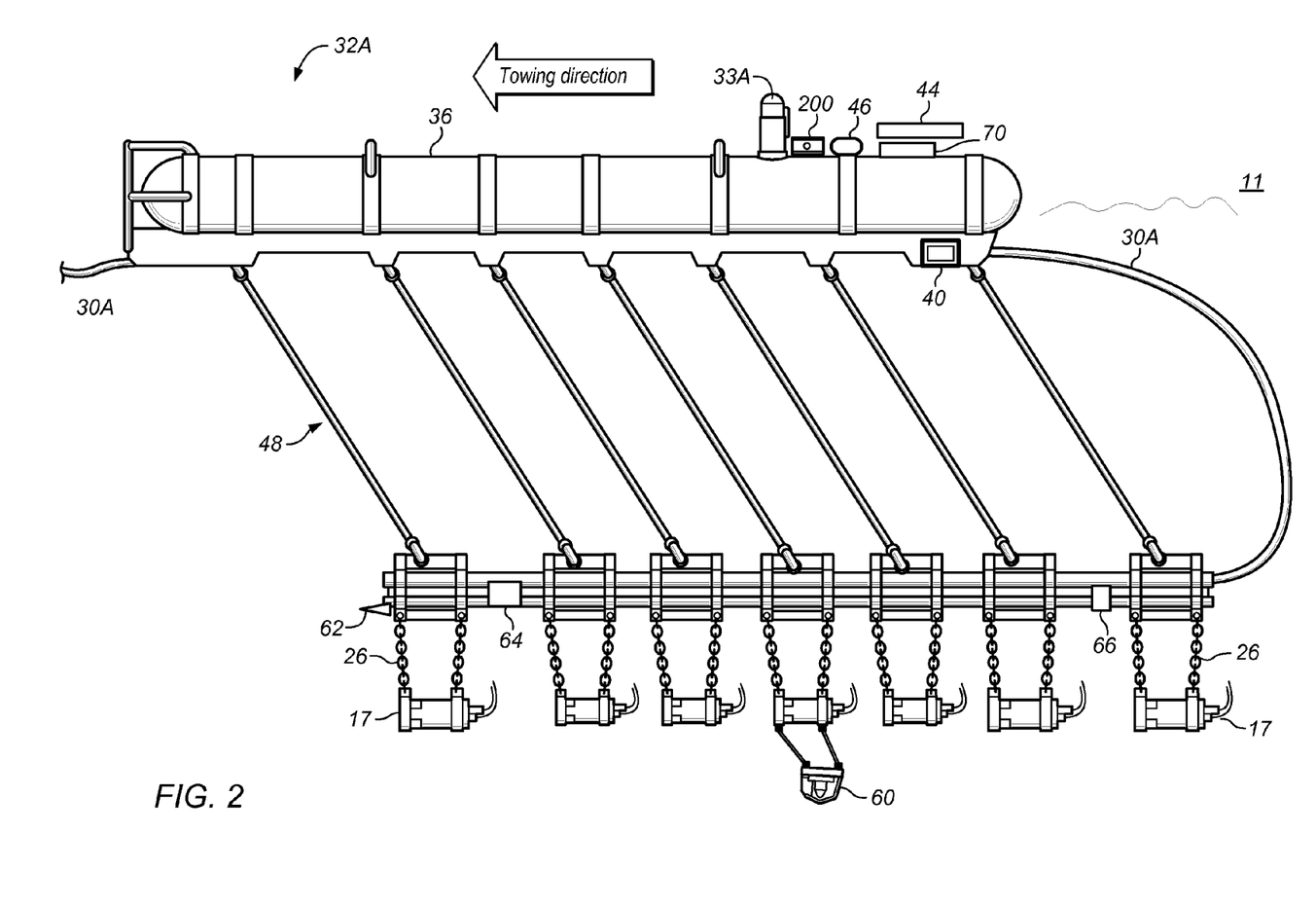
FIG. 2 illustrates one embodiment of a geophysical signal source that includes an electricity generating component.

In the embodiments illustrated in FIG. 1 and FIG. 2 (source umbilical cable 30A is partially shown in FIG. 2; the broken lines of source umbilical cable 30A indicates that this partial figure is not necessarily drawn to scale), source umbilical cable 30A may contain no power cables. In certain embodiments, such as when source umbilical cable 30A has been reconfigured from an industry standard source umbilical cable, one or more power cables may have been removed from source umbilical cable 30A. In these and other embodiments, electrical power for operation of the one or more electrical components of signal source 32A may not be supplied through source umbilical cable 30A. In alternative embodiments, however, source umbilical cable 30A including one or more power cables, may be operated such that power is not supplied through source umbilical cable 30A. In some embodiments, source umbilical cable 30A may not include a power cable configured or operable to supply electrical power through the source umbilical cable to navigation devices such as geodetic positioning devices 33A and 33B, acoustic ranging unit, and/or others. In some of these embodiments, source umbilical cable 30A may not include one or more electrical conductors or other such components that are configured and/or operable to supply electrical power through source umbilical cable 30A. As used herein, the words "supply," "supplying" and other variations may include continuously supply/supplying and/or intermittently supply/supplying.

In addition to devices such as sensors, acoustic ranging units, signal source steering devices, and geodetic positioning devices (and the electrical components each may contain), an electrical component of signal source 32A may include a circuitry configured to control signal source 32A. In the embodiment illustrated in FIG. 2, such circuitry may include a transducer housing (not shown). One or more of water depth sensor 62 and/or one or more of hydrophone 64 may be included within the transducer housing so that the circuitry may control the operation of signal source 32A based on data from water depth sensor 62 and/or hydrophone 64.

In this particular embodiment, water depth sensor 62 may include a pressure transducer that is configured to detect a pressure differential between water depth sensor 62 and surface of body of water 11. Data transmitted from water depth sensor 62 may be used to identify a location of origination of signal source 32A when signal source 32A is activated.

In this particular embodiment, hydrophone 64 may be configured to provide data indicative of magnitude, frequency, duration, timing, and/or other properties of a source signal generated by signal source 32A (e.g., the timing of the firing of the air guns in a seismic survey). In certain embodiments, particularly in seismic survey operations, data provided by hydrophone 64 may help detect air leaks and/or other problems that may occur during a marine seismic survey. Data provided by water depth sensor 62 and/or hydrophone 64 may be converted, by the circuitry, to a signal (e.g., a digital signal). Such signal may be transmitted to onboard recording system 12 of vessel 10.

In certain embodiments, signal source 32A may additionally include one or more of pressure sensor 66 configured to measure air and/or water pressures around signal source 32A. In such embodiments, pressure sensor 66 may be configured to transmit data indicative of air and/or water pressure variations. Similar to data from water depth sensor 62 and/or hydrophone 64, data provided by pressure sensor 66 may help determining properties of signal source 32A such as position, location, and others.

In the embodiment illustrated in FIG. 2, signal source 32A may include acoustic ranging unit 60 that is coupled to signal source 32A under a surface of body of water 11. In certain embodiments, acoustic ranging unit 60 may be configured to determine a relative position of signal source 32A with respect to signal source 32B.

In this embodiment, signal source 32A may include geodetic positioning device 33A that is disposed on or coupled to flotation device 36. Flotation device 36 may be configured provide buoyancy to signal source 32A. In some embodiments, an acoustic ranging system (may be referred to as "CTX") 70 may be disposed on floatation device 36. In one such embodiment, CTX 70 may determine acoustic transit times between acoustic ranging unit 60 and flotation device 36 where geodetic positioning device 33A may be, and positioning data related to signal source 32A may be determined. In one particular embodiment, a position of a center of signal source 32A may be determined based on data of acoustic ranging unit 60 and geodetic positioning device In the embodiment illustrated in FIG. 2, supporting structure 48 may be attached to floatation device 36 and may suspend signal source 32A (e.g., individual signal sources 17 of signal source 32A) into body of water 11. Flotation device 36 may be configured to provide buoyancy to supporting structure 48 and/or signal source 32A.

In the particular embodiment illustrated in FIG. 2, signal source 32A may include electricity generating component 40 that is configured to supply electrical power to electrical components of signal source 32A. In this and other embodiments, electricity generating component 40 may be a local electricity generator that is disposed in an area or a proximity local to signal source 32A. In one particular embodiment, electricity generating component 40 may be disposed near or be attached to floatation device 36. Electricity generating component 40 may, in other embodiments, be bolted onto floatation device 36 (e.g., bolted directly onto a metal keel of floatation device 36). In the embodiment illustrated in FIG. 2, electricity generating component 40 may be connected, via a cable (e.g., a cable that may be extendable and/or extended), to a control system that may be located on flotation device 36. The control system in the embodiment may be an "Elbox" to be described later in the specification. In the particular embodiment illustrated, electricity generating component 40 may be located within a length of the cable (e.g., a cable that is approximately 2 meters long and may be extended to be approximately 5 meters long) of a location of the Elbox on flotation device 36. As used herein, the term "local" refers to a location and/or an area within a length of a cable to and/or from electricity generating component 40.

In one non-limiting embodiment, instead of flotation device 36, electricity generating component 40 may be attached to another floatation device (not shown) that may be located near signal source 32A, wherein electricity generating component 40 may be local to signal source 32A. In another example, electricity generating component 40 may be attached to a paravane (not shown) that may be located near signal source 32A, wherein electricity generating component 40 may be local to signal source 32A. Yet in another example, electricity generating component 40 may be attached to a streamer (or a portion of a streamer) (not shown) that may be disposed near signal source 32A, wherein electricity generating component 40 may be local to signal source 32A.

In the embodiment illustrated in FIG. 2, electricity generating component 40 may be a power generator. Such power generator may be configured to convert mechanical energy (e g, kinetic energy) of the movement of body of water 11, or the movement of electricity generating component 40 as it is being towed by source umbilical cable 30A through body of water 11, into electrical power or electricity. In one particular embodiment, electricity generating component 40 may be a 24-volt, 12-volt, or other types of generator. In alternative embodiments, electricity generating component 40 may be a generator of electrical power or electricity based on a form of renewable energy. A form of renewable energy may include solar, wind, ocean currents, and/or other similar continually replenished signal sources. In one such embodiment, electricity generating component 40 may include a solar panel configured to convert solar energy into electrical power or electricity. In yet another such embodiment, electricity generating component 40 may include a wind turbine configured to convert wind energy into electrical power or electricity. In another embodiment, electricity generating component 40 may include a tidal energy generator configured to convert ocean tidal movements into electrical power or electricity. In certain embodiments, electricity generating component 40 may include a combination of any such embodiments. In one non-limiting embodiment, for example, electricity generating component 40 may include a power generator based on towing motion in addition to a solar panel as illustrated in FIG. 2.

In some embodiments, such generated electrical power or electricity may directly supply power to one or more electrical components of signal source 32A. In other embodiments, electrical power or electricity generated by electricity generating component 40 may be provided to one or more batteries (not separately shown) that are configured to store the electrical power generated. The one or more batteries may in turn supply electrical power to one or more electrical components of signal source 32A. In certain embodiments, such batteries may be rechargeable. And in some of such embodiments, water-resistant or water-safe rechargeable batteries may be included. In these embodiments, one or more back-up batteries may additionally be included.

In certain embodiments, electricity generating component 40 may include a control system including an Elbox by Powex AS, Norway, commercially available through Powex's partner PartnerPlast AS. The control system may include circuitries or modules that are configured to, among others, charge and maintain a charge and/or load parameters of one or more rechargeable batteries. Such circuitries or modules may be configured to regulate a correct charge of the rechargeable batteries. In one non-limiting embodiment, for example, circuitries and modules included in the control system may also be configured to interface and/or manage data transmission between geodetic sensor 33A and source umbilical cable 30A. As discussed above, electricity generating component 40 may be connected to the control system including an Elbox by a cable, e.g., wired into the Elbox (not separately shown). The cable may be extendable and/or extended. In this particular embodiment, the control system including the Elbox may be located on flotation device 36, and electricity generating component 40 may be disposed within a length of the cable (e.g., a cable having a length of approximately 2 meters and may be extended to a length of approximately 5 meters) to a location of the Elbox, wherein electricity generating component 40 may be local to signal source 32A.

Figure 3:
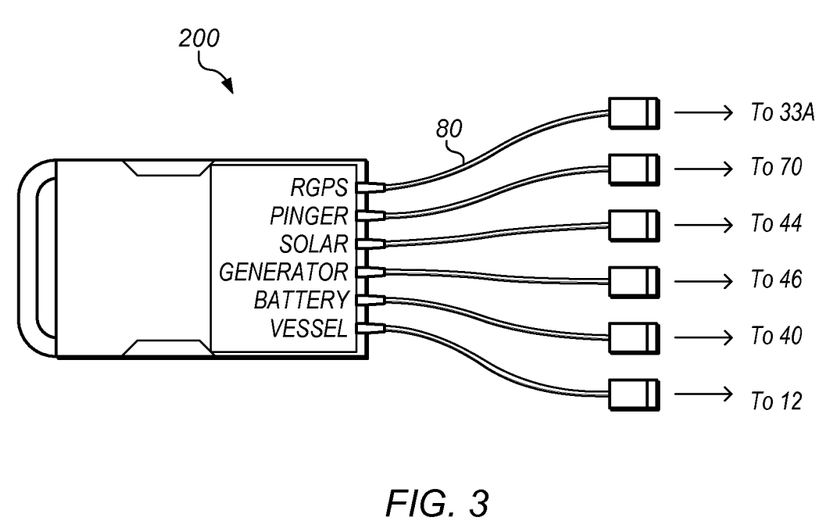
FIG. 3 illustrates a representation of a control unit for an electricity generating component of a geophysical signal source.

A representation of the control system is shown in FIG. 3 as control system 200. Control system 200 may be connected to a connector such as a multi-pin connector 80 illustrated in FIG. 3. In these embodiments, multi-pin connector 80 may be configured to connect control system 200 with various other devices and sensors (e.g., geodetic sensor 33A) by way of individual pins (e.g., paths). Multi-pin connector 80 may be connected, via source umbilical cable 30A, to recording system 12 of vessel 10. In a non-limiting embodiment, control system 200 may be connected via multi-pin connector 80 to: geodetic positioning device 33A, CTX 70, electricity generating component 40 which may include solar panel 44 and power generator 46 (e.g., based on kinetic energy of towing motion) in the embodiment illustrated in FIG. 2, and batteries such as back-up batteries and other batteries.

In some of these embodiments, control system 200 may be configured to receive and transmit signals from geodetic positioning device 33A acoustic ranging unit 60, and/or other components or devices, whereas a separate control system (not shown) may be configured to receive and transmit signals from water depth sensors 62, hydrophone 64, pressure sensor 66 and/or other components or devices. In the embodiment illustrated in FIG. 2, control system 200 and one or more electrical conductors or optic cables of source umbilical cable 30A may be connected via multi-pin connector 80. In particular, such one or more electrical conductors or optic cables of source umbilical cable 30A may be operable to transmit signals and/or data to and from recording system 12 of vessel 10. In a non-limiting example, these electrical conductors and/or optic cables may be referred to as one or more sensor lines. In these embodiments, signal source 32A may be towed by vessel (shown as 10 in FIG. 1) from an aft end of source umbilical cable 30A. Control system 200 and recording system 12 of vessel 10 may be in signal communication, by way of multi-pin connector 80 connected to source umbilical cable 30A.

Figure 4A:
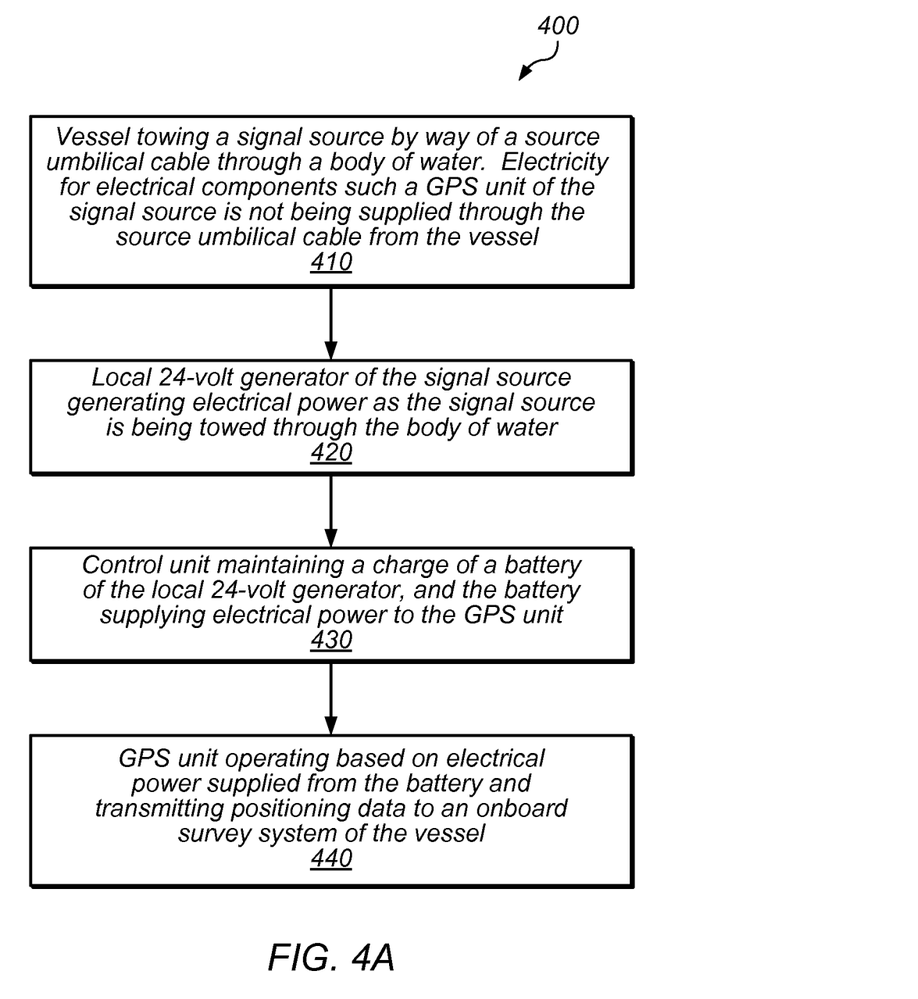
FIG. 4A illustrates a flow diagram for towing a source umbilical cable behind a vessel through a body of water.

FIG. 4A is a flow diagram illustrating one exemplary embodiment of a method 400 for towing a source umbilical cable behind a vessel through a body of water. The method shown in FIG. 4A may be used in conjunction with any of the devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, a vessel towing, through a body of water, a signal source by way of a source umbilical cable. The signal source being towed includes one or more electrical components such a GPS unit. Electrical power to operate the GPS is not being supplied through the source umbilical cable. Flow proceeds to block 420.

At block 420, a local 24-volt generator of the signal source generating electrical power based on towing motion of the signal source through the body of water. Flow proceeds to block 430.

At block 430, a control unit coupled to the local generator maintaining a charge of a battery of the generator, and the battery supplying electrical power to the GPS unit attached to the signal source. Flow proceeds to block 440.

At block 440, the GPS unit of the signal source operating based on electrical power supplied from the battery. The GPS unit transmitting positioning data to an onboard survey system of the vessel. A location of the signal source may be determined based on the positioning data. Such location may be a factor in analyzing the geophysical responses from the subterranean formation. Flow may end at block 440.

Figure 4B:
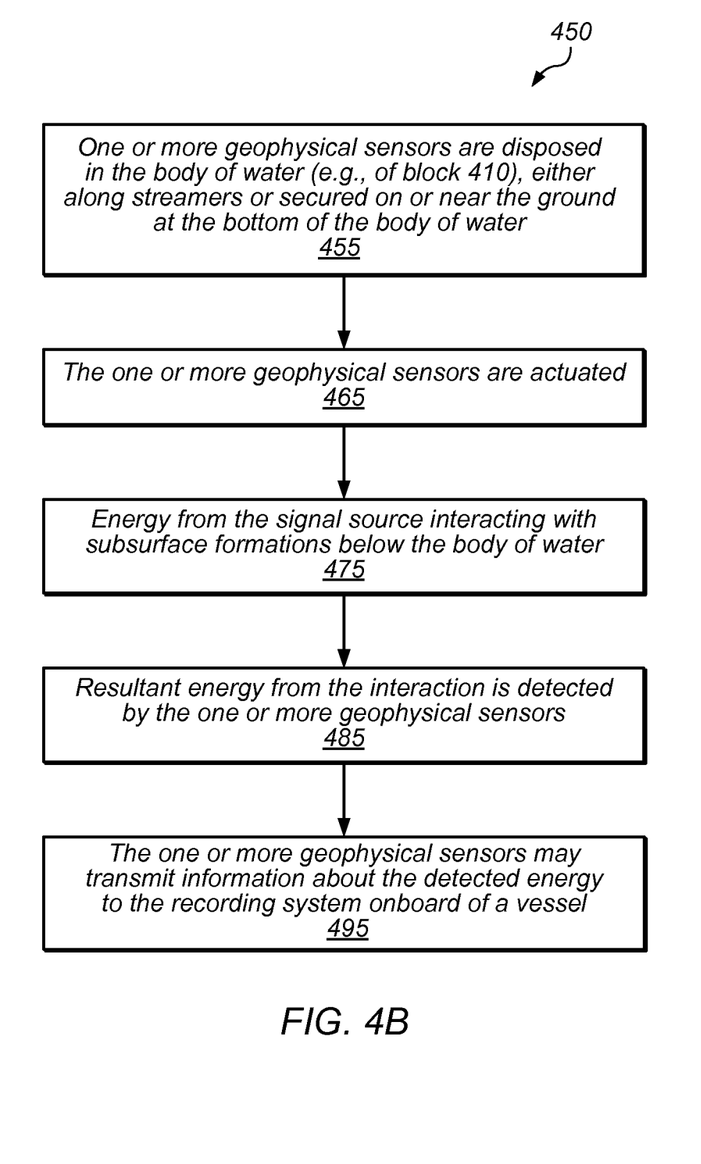
FIG. 4B illustrates a flow diagram for conducting a geophysical survey at least partially based on the illustration in FIG. 4A.

Method 400 for towing a source umbilical cable behind a vessel through a body of water may be extended by method 450 illustrated in FIG. 4B for conducting a geophysical survey. The method shown in FIG. 4B may be used in conjunction with any of the devices, elements, or components disclosed herein, among other devices. In various embodiments, some of the method elements shown may be performed concurrently, in a different order than shown, or may be omitted. Additional method elements may also be performed as desired. Flow may continue from block 440 and may begin at block 455.

At block 455, one or more geophysical sensors are disposed in the body of water (e.g., at block 410), either along streamers or secured on or near the ground at the bottom of the body of water. Flow proceeds to block 465.

At block 465, the one or more signal sources are actuated. Flow proceeds to block 475.

At block 475, energy from the signal source interacting with subsurface formations below the body of water. Flow proceeds to block 485.

At block 485, resultant energy from the interaction at block 475 is detected by the one or more geophysical sensors. Flow may end at block 475 or flow may proceed to optional block 495.

At optional block 495, the one or more geophysical sensors may transmit information about the detected energy to the recording system onboard of a vessel. Flow ends at block 495.

In accordance with an embodiment, a geophysical data product indicative of certain properties of the subsurface formation may be produced from the detected energy. The geophysical data product may include processed seismic or electromagnetic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

Figure 5:
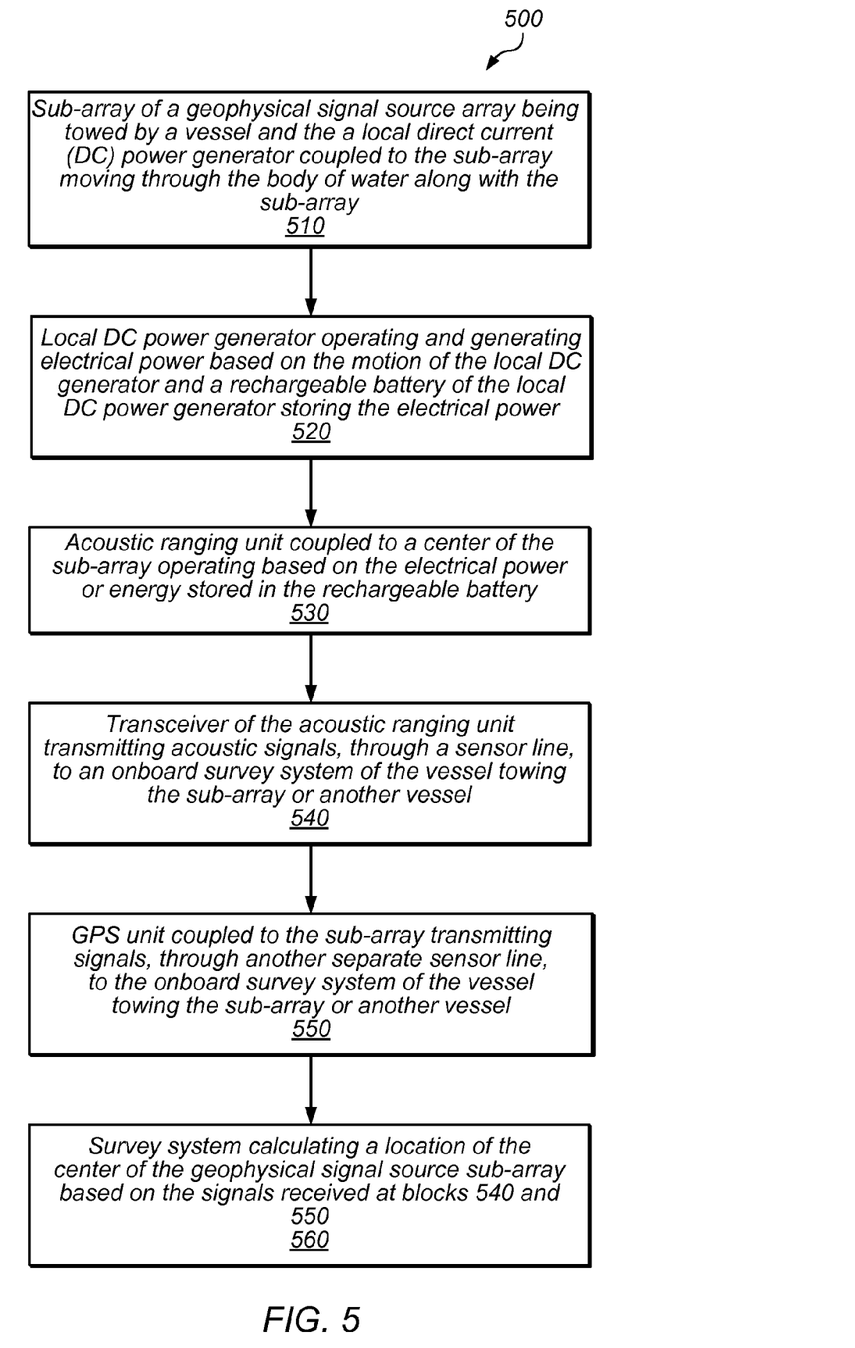
FIG. 5 illustrates a flow diagram of a method for determining a position of a geophysical signal source array.

FIG. 5 is a flow diagram illustrating an exemplary embodiment of a method 500 for determining a position of a center of a geophysical signal source sub-array. The method shown in FIG. 5 may be used in conjunction with any of the devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, a sub-array of a geophysical signal source array being towed through a body of water by a vessel. The geophysical signal source sub-array includes a local direct current (DC) power generator moving through the body of water along with the geophysical signal source sub-array. Flow proceeds to block 520.

At block 520, the local DC power generator operating and generating electrical power based on the motion of the local DC generator. A rechargeable battery included in the local DC generator storing the electrical power generated. Flow proceeds to block 530.

At block 530, an acoustic ranging unit operating based on the electrical power energy stored in the rechargeable battery. The acoustic ranging unit is disposed at a center of the geophysical signal source sub-array. Flow proceeds to block 540.

At block 540, the acoustic ranging unit that includes a transceiver transmitting acoustic pulses or signals, through a sensor line, to an onboard survey system of a survey vessel. In this non-limiting embodiment, one end of the sensor line is coupled to the geophysical signal source sub-array, and the other end of the sensor line is coupled to the onboard survey system of the vessel towing the geophysical signal source sub-array or another vessel. Flow proceeds to block 550.

At block 550, a GPS unit attached to the geophysical signal source sub-array transmitting signals, through another, separate, sensor line, to the onboard survey system. The signals transmitted by the GPS unit are indicative of a position of the geophysical signal source sub-array. Flow proceeds to block 560.

At block 560, the survey system calculating a location of the center of the geophysical signal source sub-array based on the signals received at blocks 540 and 550. Flow ends at block 560.

Figure 6:
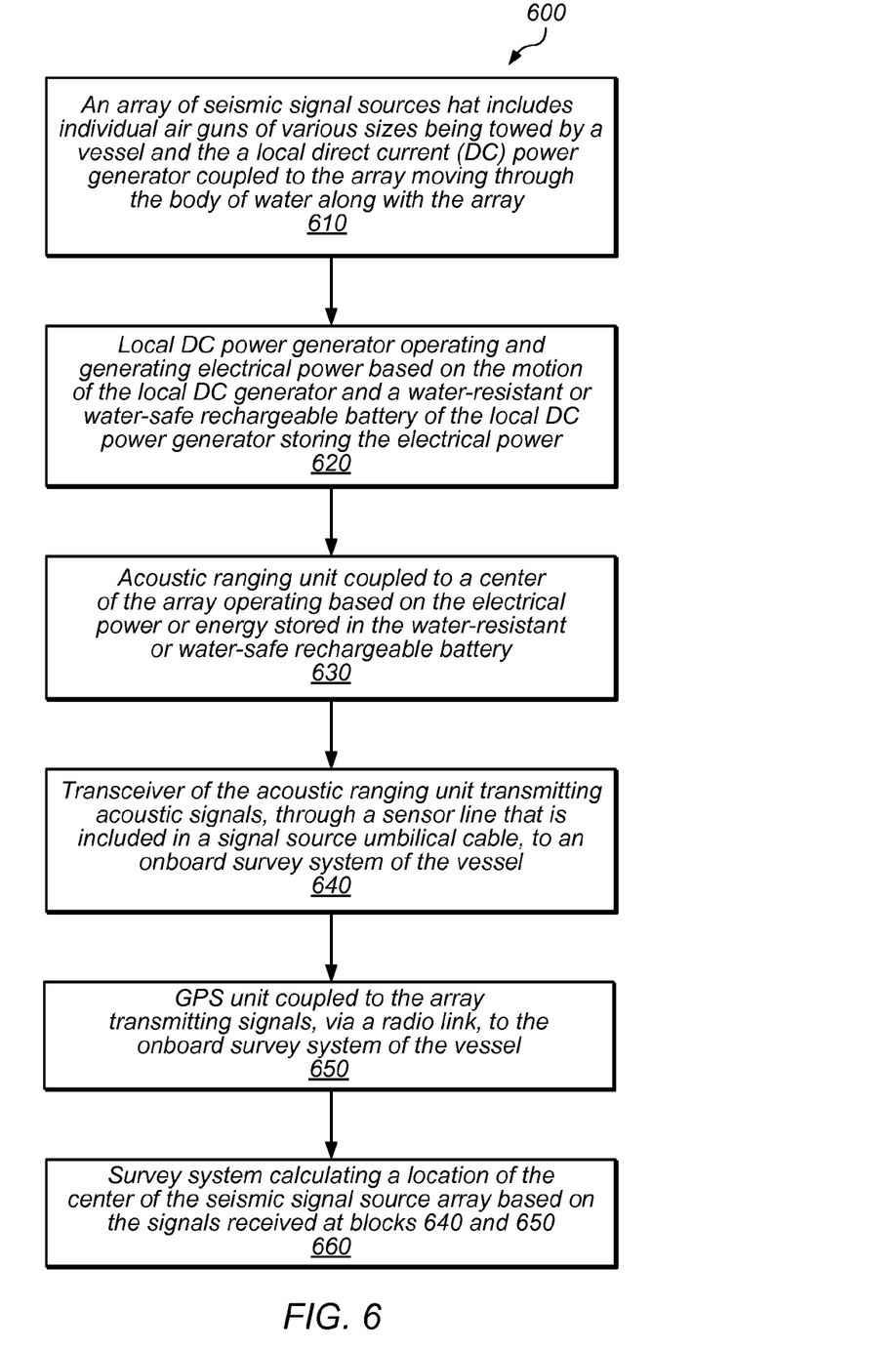
FIG. 6 illustrates a flow diagram illustrating an exemplary embodiment of a method for operating an acoustic ranging unit and a GPS unit based on power generated using a local generator.

FIG. 6 is a flow diagram illustrating an exemplary embodiment of a method 600 for operating an acoustic ranging unit and a GPS unit based on power generated using a local generator. The method shown in FIG. 6 may be used in conjunction with any of the devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, an array of seismic signal sources that includes a plurality of individual air guns of various sizes being towed through a body of water by a vessel. The seismic signal source array includes a local direct current (DC) power generator generating electricity based on the towing motion of the DC generator through the body of water. Flow proceeds to block 620.

At block 620, the local DC power generator operating and generating electrical power based on the towing motion of the local DC generator. A water-resistant or water-safe rechargeable battery included in the local DC generator storing the electrical power generated. Flow proceeds to block 630.

At block 630, an acoustic ranging unit operating based on electrical power or energy stored in the rechargeable battery. The acoustic ranging unit is disposed on the seismic signal source array. Flow proceeds to block 640.

At block 640, the acoustic ranging unit that includes a transceiver transmitting acoustic pulses or signals at a set time interval (e.g., every 2 seconds), through a sensor line that is included in the umbilical cable, to an onboard survey system of the vessel which may be a survey vessel or another type of vessel. Flow proceeds to block 650.

At block 650, a GPS unit attached to the seismic signal source array transmitting signals, via radio communication, to the onboard survey system. The radio signals transmitted by the GPS unit are indicative of an absolute position of the seismic signal source array. Flow proceeds to block 660.

At block 660, the survey system calculating a location of the seismic signal source array based on the signals received at blocks 640 and 650. Flow ends at block 660.

Figure 7:
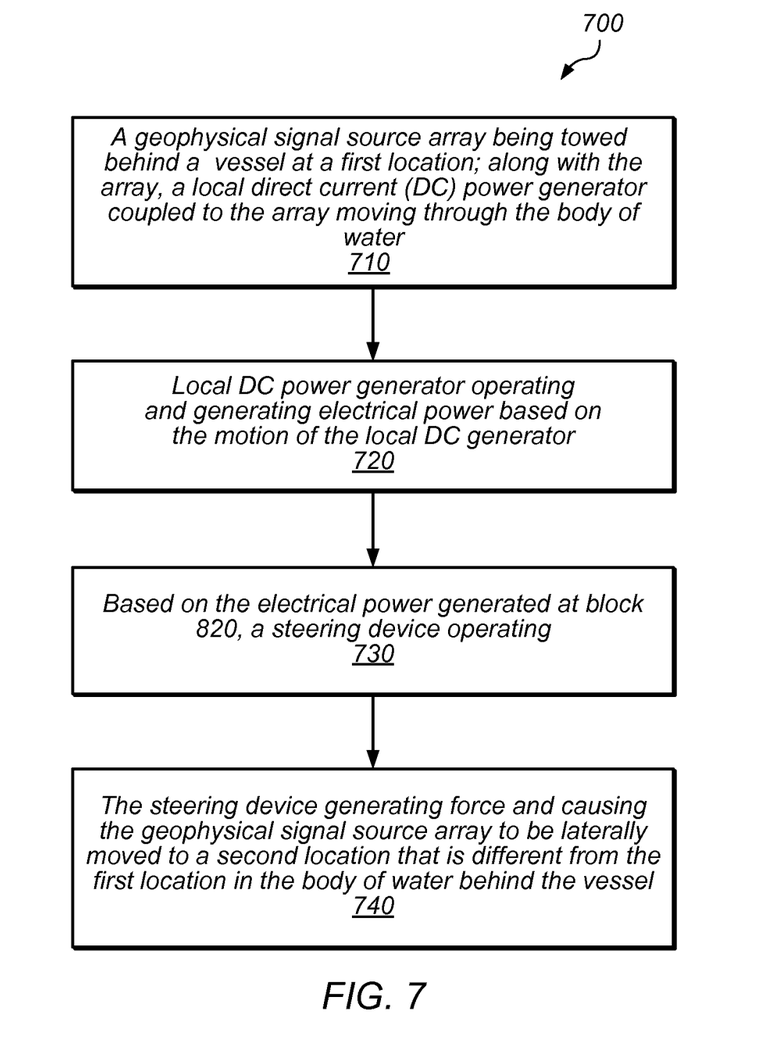
FIG. 7 illustrates a flow diagram of a method for operating a steering device based on power generated using a local generator.

FIG. 7 illustrates a flow diagram illustrating an exemplary embodiment of a method 700 of a method for operating a steering device based on power generated using a local generator. The method shown in FIG. 7 may be used in conjunction with any of the devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, being towed through a body of water behind a vessel is an array of geophysical signal sources. The array of geophysical signal sources is being towed behind the vessel at a first location in the body of water. The geophysical signal source array includes a local direct current (DC) power generator generating electricity based on the towing motion of the DC generator through the body of water. Flow proceeds to block 720.

At block 720, the local DC power generator of the geophysical signal source array operating and generating electrical power based on the towing motion of the local DC generator. Flow proceeds to block 730.

At block 730, a device that is included on the geophysical signal source array operating based on energy generated by the local DC power generator. The device is configured to control, steer, and/or guide a movement, a location, or a position of the geophysical signal source array. The device may be referred to as a steering device or geophysical signal source steering device. Flow proceeds to block 740.

At block 740, the geophysical signal source steering device generating force causing the geophysical signal source array to be laterally moved (e.g., relocated) to a second location in the body of water, and the second location is different from the first location. The geophysical signal source array is being towed by behind the vessel at the second (e.g., new) location. Flow ends at block 740.

Operating a source umbilical cable without functioning power cables may provide various benefits including reducing the diameter, cost, and drag force of the source umbilical cable. A reduction in source umbilical cable diameter may result in advantages such as additional load on a reel, longer lay backs, longer source offsets, and reduced seismic offsets.

Operating a source umbilical cable without functioning power cables may increase productivity during operation. Inefficiencies may be reduced including those inefficiencies caused by loss of productivity and downtime related to the power cables such as failing or leaking lines in the source umbilical cable and feedback or interference to sensors. Moreover, a source umbilical cable without functioning power cables may have additional capacity to transmit data from the signal sources to an onboard survey system of a vessel. Data transmitted through a telemetry line, for example, included in the source umbilical cable, may be more reliable than those transmitted over a radio communication link.

Operating a source umbilical cable without functioning power cables may further increase operation efficiency by simplifying the configuration of a source umbilical cable. As a result, the source umbilical cable may be less time and labor intensive to test and repair. For example, an operator with skills to reterminate a source umbilical cable may be able to reterminate a source umbilical cable without functioning power cables. The same skill sets and knowledge relevant to source umbilical cables may thus be leverageable rendering efficient the transition to the source umbilical cable without functioning power cables.

The inclusion of a local electrical power generator to a signal source may be advantageous in various aspects. In one aspect, a voltage drop from the electricity generating component and the device receiving the electricity may be reduced by having a local generator close to the device receiving the electricity. In another aspect, the quantity of signal sources may no longer be limited by the capacity to supply electrical power from a vessel through power cables. In yet another aspect, the capacity of the power supply system may no longer limit the capacity of certain equipment. For example, an acoustic ranging unit may demand a constant supply of a substantial amount of electrical power to transmit acoustic pulses of sufficient energy to achieve quality long ranges.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
towing behind a first vessel through a body of water, a source umbilical cable coupled to a geophysical signal source that includes navigation equipment that is configured to determine a position of the geophysical signal source; and
supplying electrical power to the navigation equipment via an electricity generating component disposed at the geophysical signal source, wherein the source umbilical cable does not include a power cable that is configured to provide electrical power to the navigation equipment.

2. The method of claim 1, wherein the navigation equipment includes a GPS unit.

3. The method of claim 1, wherein the navigation equipment includes an acoustic ranging unit.

4. The method of claim 1, wherein the geophysical signal source further includes a battery configured to provide electrical power to the navigation equipment.

5. The method of claim 4, wherein the electricity generating component includes a control unit that is configured to regulate a charge of the battery.

6. The method of claim 1, wherein the electricity generating component is configured to generate power based on motion related to towing the geophysical signal source through the body of water.

7. The method of claim 1, further comprising:
receiving, through the source umbilical cable, data transmitted by the navigation equipment.

8. The method of claim 1, further comprising supplying electrical power to a device configured to control a movement of the geophysical signal source via the electricity generating component disposed at the geophysical signal source.

9. The method of claim 1, further comprising:
detecting energy using one or more geophysical sensors disposed in the body of water; and
producing a geophysical data product from the detected energy indicative of certain properties of a subsurface formation below the body of water.

10. A method, comprising:
towing a geophysical signal source behind a vessel through a body of water, wherein the geophysical signal source includes navigation equipment configured to determine a position of the geophysical signal source; and
supplying electrical power to one or more components of the geophysical signal source, wherein the one or more components include the navigation equipment, and wherein the electrical power is supplied by a local generator of the geophysical signal source.

11. The method of claim 10, further comprising charging a battery at the geophysical signal source with the supplied electrical power.

12. The method of claim 10, further comprising:
towing the geophysical signal source behind the vessel by a source umbilical cable, wherein the source umbilical cable does not include a power cable configured to provide electrical power to the navigation equipment.

13. The method of claim 10, further comprising:
receiving, through a source umbilical cable coupled to the geophysical signal source, data indicative of a position of the geophysical signal source.

14. The method of claim 10, further comprising:
the local generator generating electrical power based on a source of renewable energy.

15. The method of claim 10, further comprising:
detecting energy using one or more geophysical sensors disposed in the body of water; and
producing a geophysical data product from the detected energy indicative of certain properties of a subsurface formation below the body of water.

16. An apparatus, comprising:
a first geophysical signal source including a generator, wherein the generator is configured to supply electrical power to one or more components of the first geophysical signal source, wherein the one or more components include navigational equipment configured to determine a position of the first geophysical signal source; and
a source umbilical cable configured to tow the first geophysical signal source through a body of water, wherein the source umbilical cable does not include a power cable configured to provide electrical power to the navigation equipment.

17. The apparatus of claim 16, wherein the generator includes a solar panel.

18. The apparatus of claim 16, wherein the generator is configured to generate electrical power based on motion of the generator through a body of water.

19. The apparatus of claim 16, further comprising:
a connector configured to transmit, through the source umbilical cable, data indicative of the position of the first geophysical signal source.

20. The apparatus of claim 16, wherein the navigation equipment includes a transmitter configured to transmit positioning data of the first geophysical signal source.

21. The apparatus of claim 20, wherein the one or more components includes one or more of the following: a GPS unit, an acoustic ranging unit, and a pressure sensor.

22. The apparatus of claim 16, further comprising:
an array of a plurality of geophysical signal sources, wherein none of the plurality of geophysical signal sources in the array is coupled to a source umbilical cable that includes a cable configured to supply electrical power through the source umbilical cable.

* * * * *